July 5, 1927.
W. J. DECOTEAU
FLOCK CUTTING MACHINE
Filed May 12, 1925
1,634,741
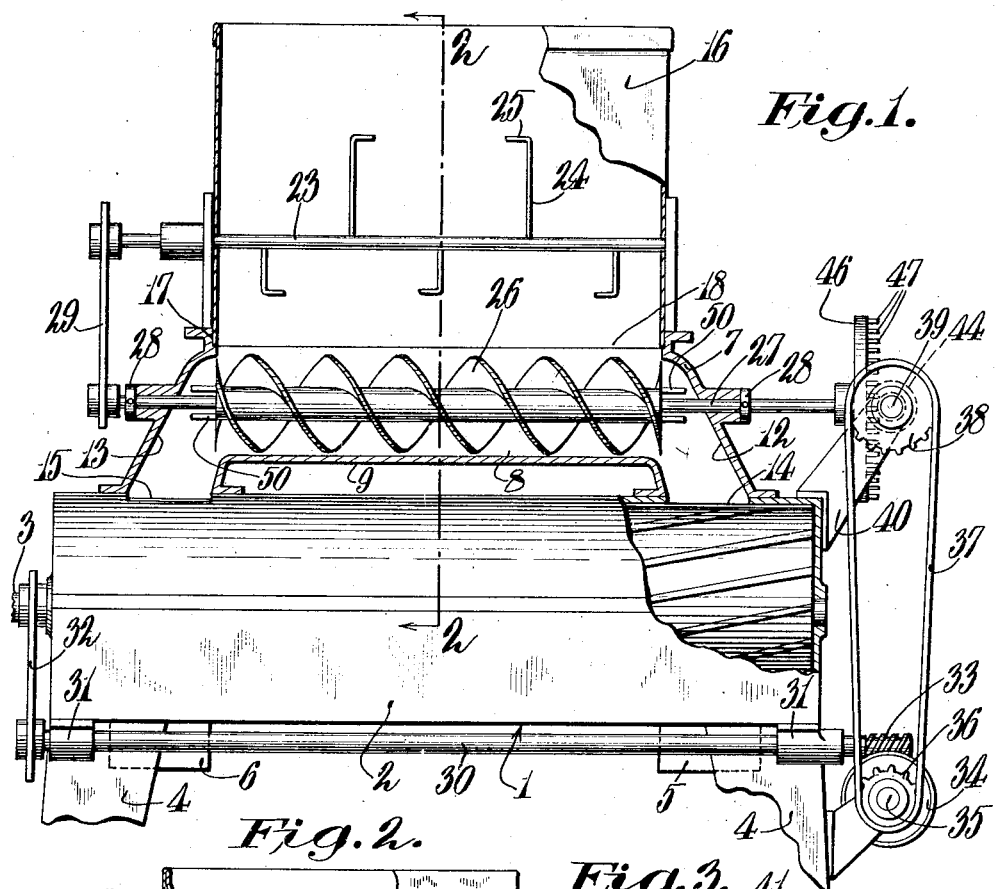
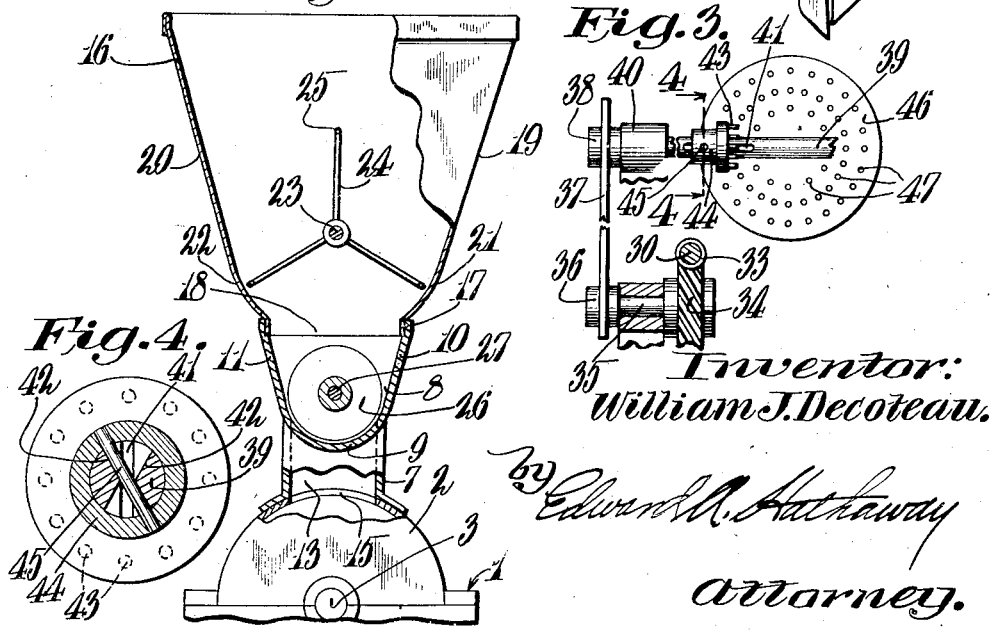
Inventor:
William J. Decoteau.
by Edward M. Hathaway
Attorney.

Patented July 5, 1927.

1,634,741

UNITED STATES PATENT OFFICE.

WILLIAM J. DECOTEAU, OF CLAREMONT, NEW HAMPSHIRE, ASSIGNOR TO CLAREMONT WASTE MANUFACTURING COMPANY, A CORPORATION OF NEW HAMPSHIRE.

FLOCK-CUTTING MACHINE.

Application filed May 12, 1925. Serial No. 29,813.

This invention relates generally to flock cutting machines and more particularly to an improved feeding mechanism therefor.

As is well known, it is somewhat difficult to feed flock to the cutters due to the flock being extremely light and fluffy, which conditions, when feeding from a main hopper, are not conducive to satisfactory gravity feeding or to the use of certain types of mechanical feeds. In certain of the mechanical feeds heretofore used the flock was fed by reciprocating means to the cutter. The objection to this is that the flock is fed in batches to the cutter which does not have a proper opportunity to cut the flock uniformly. To obtain a substantially constant feed and a uniform cut I have provided a feed screw and cooperating passages so arranged that the flock may be substantially continuously and uniformly pressed to the cutter. It was found that if a feed screw was applied to a flock cutter in the same manner as feed screws are usually employed the screw was unfit to cope with the extremely peculiar characteristics of flock so far as producing a uniform feed. For instance, it was found after considerable experimentation that if the passages were made too long or not properly shaped or spaced relative to the screw or cutter the flock would pack in the passages with the result that sometimes this mass of packed flock would suddenly feed to the cutter while at other times the flock would simply remain stationary while the screw churned or rolled back the flock. Hence the whole operation was extremely uncertain and at best was no better than the reciprocating feeds. Moreover the problem of obtaining a uniform feed is complicated for the flock, due to its extremely light and fluffy condition, will bridge over openings. By properly combining the screw and passages the difficulties were overcome. To obtain proper feeding to the screw from the hopper there is provided an agitator so disposed relative to the hopper and screw that the screw can uniformly be kept filled. The agitator definitely cooperates with the screw and passages to such an extent that it is more than a mere agitator and in fact is a part of the feeding mechanism. Also by using a screw I have been able to solve the additional problem of feeding to both ends of the flock cutter by a particular disposition of the screw relative to the cutter.

It is usual to reverse periodically the direction of cutter rotation and feed the flock to opposite ends of the cutter in accordance with the direction of cutter rotation to thereby keep the cutter blades sharp. With my improved feeding mechanism I have been able to take advantage of this reversible cutter rotation to feed flock automatically to opposite ends of the cutter in accordance with the direction of rotation. Such a construction eliminates the necessity of an attendant to operate manually suitable mechanism for reversing the feed. In fact, in independently operable feeding and cutting mechanisms, if the attendant should fail to reverse the feed with the cutter, clogging up of the cutter might result for the cutter blades are usually of the spiral type and the flock is fed to one end of the cutter and worked toward the opposite end, due to the spiral, to be discharged. Accordingly, if the flock is fed to the wrong end of the cutter the flock would be working against the spiral and could not discharge at the opposite end which would result in continuous feeding of flock to the cutter but not in any discharge therefrom. Hence by making my feed automatically reversible in accordance with the direction of cutter rotation, I have eliminated a source of possible difficulty.

In one specific aspect of my invention as disclosed herein I employ a longitudinally extending screw disposed within a casing having discharge openings at each end thereof which lead to the respective ends of the flock cutter, the openings in the particular instance being flared for I have found that such a construction prevents bridging or choking of the material within these passages. Disposed immediately above the screw is a flock hopper within which suitable agitating mechanism may be disposed for insuring among other possible advantages that the flock in its light and fluffy condition may be permitted to come into proper contact with the feed screw. The agitator cooperates with the screw by moving very close thereto, thereby insuring that the screw is filled with flock. The agitator further cooperates with the screw by preventing the latter from packing flock into one end of the hopper which might otherwise take place due to the continual spiraling movement of the screw in one direction.

In my improved arrangement I have also provided improved means for coordinating the rotation of the flock cutter, feed screw, and agitating mechanism. It will of course be understood that certain of these elements may be omitted if the material to be fed is suitable, although in the general operation it is found desirable to utilize the agitator and feed screw in combination, thus being able to take care of the general run of flock regardless of the quality or condition thereof.

It is a further object of my invention to provide an improved driving mechanism for the feeding mechanism whereby varying rates of feed may be obtained. In the specific embodiment herein illustrated the improved driving mechanism includes a pair of cooperating speed reduction members of a positive drive type, one of which is so arranged that it may be slid longitudinally on its shaft and by an extremely simple pin and slot arrangement be held in a fixed position relative to the longitudinal axis of the shaft thereby to obtain by cooperation with the other member a predetermined driving speed of the feed screw. A series of these slots will be formed in the shaft depending upon the number of speeds that may be desired for driving the feeding mechanism.

In the accompanying drawings I have shown for purposes of illustration one form which my invention may assume in practice.

In these drawings,—

Fig. 1 is a side elevation of a flock cutter and my improved feeding mechanism mounted thereon, part of which is broken away to show details of construction.

Fig. 2 is a vertical transverse sectional view on line 2—2 of Fig. 1.

Fig. 3 is a view of my improved variable speed driving mechanism seen from the direction of the arrows 2 in Fig. 1.

Fig. 4 is a transverse section on line 4—4 of Fig. 3.

In the illustrative embodiment of my invention I have shown a flock cutter, generally indicated 1, having a usual housing 2 within which revolving cutters 2' are mounted upon a reversible drive shaft 3. The housing 2 is supported upon suitable legs 4 to permit a suitable container to be inserted beneath the housing 2 to receive the cut flock from either one of the discharge chutes 5 and 6.

The feeding mechanism comprises a casting 7, preferably made of aluminum to prevent rusting by any sweating action of the flock, having a longitudinal passage 8 bounded by a semi-cylindrical wall 9 and flaring walls 10 and 11, the ends of the passage communicating with discharge passages 12 and 13 preferably flared towards the lower end thereof to prevent choking thereof by the light and fluffy flock. It is found that a passage of uniform dimensions is for various reasons not highly conducive to the proper feeding of the flock. The passages 12 and 13 communicate with the opposite ends of the housing 2 as through openings 14 and 15. A hopper 16 herein made of sheet metal is fitted in a recess 17 formed adjacent an opening 18 in the upper end of the casting 7. The sides 19 and 20 are herein shown as flared outwardly from the casting 7 and have near the lower end thereof curved portions 21 and 22 the radius of which is struck from the center of rotation of a shaft 23 comprising a part of the agitating mechanism.

The agitating mechanism herein specifically disclosed comprises a series of radially extending rods 24 each having a bent end 25, it being noted from Fig. 2 that said rods are angularly disposed about the shaft 23, although it will be clear that any angular disposition and longitudinal relation of the rods could be had relative to the shaft 23. As shown in Fig. 2, the rods are adapted to pass adjacent the inner surface of the curved portions 21 and 22 of the hopper 16 and closely adjacent the upper surface of a feed screw 26 disposed within the passage 8 and fixed to a rotatable shaft 27 extending through the passages 12 and 13 and held in longitudinal fixed relation by collars 28. One end of the shaft 27 is connected to the shaft 23 by suitable sprocket and chain connections 29, although it will be clear that any other suitable gearing could be used to drive the agitator.

My improved driving mechanism for my feeding mechanism and which permits the automatic discharge from either end of the screw without necessitating the use of a separate control comprises a shaft 30 journaled in suitable bearings 31 carried by the housing 2 and having at one end sprocket and chain connection 32 with the drive shaft 3. A worm 33 fixed to the other end of the shaft 30 meshes with a worm wheel 34 fixed upon a shaft 35 to drive a sprocket 36 in turn connected by a chain 37 to a sprocket 38 fixed to a shaft 39 rotatably mounted in suitable bearing brackets 40. As shown in Fig. 3, the shaft 39 has a longitudinal slot 41 extending diametrically therethrough and provided at spaced intervals with a series of opposed transverse notches 42. Mounted upon the shaft 39 is what might be termed a pinion element of my improved driving connection which comprises a series of pins 43 mounted in the face of a flange carried upon a hub 44. A pin 45 extends through the hub and is adapted as shown in Fig. 4 to engage simultaneously diagonally opposite notches 42. If it is desired to shift the pinion member the same may be manually rotated until the pin 45 is in alinement with the longitudinal slot 41, whereupon the pinion may be moved longitudinally until opposite to another set of notches 42. The pin 45 will be held in the notches due to the driving torque applied to the shaft and as the rotation of the shaft is uniform there will be no tendency for the pin to be dislodged from this predetermined position. During reversal of the cutters the pin 45 will be lodged in the notches opposite to those in which it is shown as lodged in Fig. 4. In order to drive the feed screw shaft 27 a member 46 which might be termed a gear is provided with a series of concentrically disposed pins 47. The pins 43 and 47 are so arranged as to have proper meshing engagement, thereby positively to transmit power to the screw 27, it also being noted that the notches 42 are so spaced that they permit engagement of the pinion with any of the concentrically disposed pins 47, thereby obtaining the varying speed drive.

From the above disclosure of one specific embodiment of my invention it will thus be seen that I have provided an improved feeding mechanism for a flock cutter adapted automatically to feed flock to either end of the cutters in accordance with the direction cutter rotation without in any way necessitating a separate control for the feeding mechanism, thus rendering the mechanism as a whole extremely simple and yet highly efficient for its intended purpose. While screw feeds are of course well known in the art, the utilization of the same in a flock cutter so as to feed flock to one end of the cutter or the other automatically in accordance with the direction of rotation of the cutter is to my knowledge a new and improved combination operating in a manner peculiar to this particular combination. This automatic discharge function is in distinction to those types of general feeding mechanism employing feed screws for discharging material from either end of a passage, in that these mechanisms do not have any dependency on some cooperating mechanism which in itself will have a reversible function. In my present device this reversible function directly controls the reversibility of the feeding mechanism.

It has only been found after considerable experimentation and expense that such details as the flaring discharge passages 12 and 13, the straight and curved portions 9 and 10 of the casting 7, the use of the agitator mechanism, the feed screw, and other details of construction all add to the efficient operation of the flock cutter mechanism as a whole. Prongs 50 carried by the screw prevent the flock from bridging around the shaft. Prongs 50 are carried by the screw.

While I have in this application specifically described one form which my invention may assume in practice, it will be understood that this form has been used for purposes of illustration and that the invention may be modified and embodied in various other forms without departing from its spirit or the scope of the appended claims.

What I claim as new and desire to secure by Letters Patent is:

1. The combination with a flock cutter, of means for feeding flock thereto by pressure, including a receptacle and means for effecting substantially uniform conveyance of flock from the receptacle to said cutter.

2. The combination with a flock cutter of the reversible rotary cutter type, of a hopper, and means for feeding flock from said hopper to one end or the other of said cutter automatically in accordance with the direction of cutter rotation.

3. The combination with a flock cutter, of means for feeding flock thereto, including a receptacle and means for effecting substantially uniform conveyance of flock from the receptacle to said cutter, said latter means comprising a mechanical conveyor.

4. The combination with a flock cutter, of means for feeding flock thereto, including a receptacle and means for effecting substantially uniform conveyance of flock from the receptacle to said cutter, said latter means comprising a mechanical conveyor adapted to be continuously movable in one direction.

5. The combination with a flock cutter having a hopper, of means forming a closed passage having communication at its ends with said cutter and hopper, and a mechanical conveyor adapted to be continuously movable in one direction for feeding flock from said hopper, through said passage to said cutter.

6. The combination with a flock cutter, of means for feeding flock thereto at a substantially uniform rate including a feed screw having substantially uniform rotation.

7. The combination with a flock cutter having a housing and a cutter therein, of a feed screw therefor, and means whereby said screw discharges directly and positively to said cutter.

8. The combination with a flock cutter having a housing and a cutter therein, of a screw feed mechanism therefor longitudinally disposed over said housing, and means whereby said screw discharges directly and positively to said cutter.

9. The combination with a flock cutter, of means forming a longitudinal passage terminating in a discharge passage, the cross-sectional area of said discharge passage increasing substantially to the point of discharge thereof, and means for effecting conveyance of flock through said longitudinal and discharge passages.

10. The combination with a flock cutter, of a mechanical feed conveyor therefor, and means movable relative to said conveyor for maintaining substantially uniform flow of flock thereto.

11. The combination with a flock cutter, of a feed screw therefor, and means movable relative to said screw for maintaining the space within the screw full of flock.

12. The combination with a flock cutter, of a feed screw, means for substantially uniformly feeding flock to said screw, and means whereby said screw substantially uniformly feeds flock to said cutter.

13. The combination with a flock cutter, of a feeding mechanism therefor including a screw, and a relatively movable agitator cooperating therewith for feeding flock thereto.

14. The combination with a flock cutter, of a flock receptacle, a feed screw, and agitator mechanism disposed in said receptacle and movable past said screw and relatively close thereto.

15. The combination with a flock cutter, of a flock receptacle having an opening, a passage below said opening communicating therewith and leading to said cutter, a feed screw in said passage, and an agitator mechanism movable across said opening and relatively close to said screw.

16. The combination with a flock cutter, of a feeding mechanism comprising a passage having a discharge opening at an end thereof, a feed screw in said passage terminating at the juncture of said passage and opening, and means whereby flock is fed at a substantially uniform rate to said cutter after leaving said screw.

17. The combination with a flock cutter, of means for feeding flock thereto, including a receptacle and means for effecting substantially uniform conveyance of flock from the receptacle to said cutter, said latter means comprising a mechanical conveyor adapted to be continuously movable in one direction to produce movement of flock along a substantially linear path, and an agitator movable relative to said conveyor for feeding flock thereto.

18. The combination with a flock cutter, of a hopper having a lower curved wall terminating adjacent a discharge opening which communicates directly with the interior of said hopper, and a rotatable agitator mechanism having members which sweep along said walls and across said opening.

19. The combination with a flock cutter, of a hopper having curved lower walls and a discharge opening adjacent thereto, a rotatable agitator disposed within said hopper and cooperating with the curved portions of said walls, thereby to insure feeding of the flock through said opening, and means forming a passage disposed below said opening and leading to the cutter.

20. The combination with a flock cutter, of a receptacle having an opening, a feed screw disposed below said opening and parallel thereto, a passage within which said screw is disposed, and a rotary member in said receptacle having a plurality of outwardly extending flock engaging members the outer ends of which extend substantially parallel to the screw and sweep thereover and adjacent said opening.

21. The combination with a flock cutter, of a feed screw therefor, and a passage within which said screw is disposed, and a discharge passage leading to the cutter from said screw passage, said discharge passage having its cross sectional area increase towards the point of final discharge.

22. The combination with a flock cutter, of means forming a horizontal passage terminating in a discharge passage which extends downwardly from said horizontal passage, the cross-sectional area of said discharge passage increasing towards the discharge point thereof, and a feed screw disposed within said longitudinal passage to feed flock through said discharge passage to said flock cutter.

23. The combination with a flock cutter, a passage leading to said cutter, a screw partially filling said passage and having a shaft extending through the remainder of said passage, and means to prevent bridging of flock around said shaft after discharge of flock from said screw.

24. The combination with a flock cutter, of means for feeding flock thereto including a screw, means forming a discharge opening therefor, and prongs carried by said screw and extending into said opening.

25. The combination with a flock cutter, of means for feeding flock thereto, including a screw, means forming a discharge passage therefor beyond the end of said screw, and a prong carried by said screw and extending into said passage.

26. The combination with a flock cutter, of a feeding mechanism therefor including a screw, and means whereby the same is adapted to feed flock at a substantially uniform rate to said cutter during uniform rotation of the screw, said means including passages cooperating with said screw.

27. The combination with a flock cutter, of a feeding mechanism therefor including a screw adapted to discharge material to opposite ends of said cutter.

28. The combination with a flock cutter of the reversible rotary cutter type, of a feeding mechanism therefor including a screw adapted to feed flock from one or the other of the opposite ends thereof to one or the other of the opposite ends of the cutter depending upon the direction of cutter rotation.

29. The combination with a flock cutter of the reversible rotary cutter type, of a feeding mechanism therefor including a screw adapted to discharge material to said cutter from one or the other of the opposite ends of said screw automatically in accordance with the direction of cutter rotation.

30. The combination with a flock cutter having a housing and a cutter therein, of a screw feed mechanism therefor longitudinally disposed over said housing and adapted to discharge flock to opposite ends of the cutter.

31. The combination with a flock cutter having a housing and a cutter therein, of a feeding mechanism therefor including a screw, and means forming a passage leading to said cutter and having a curved bottom the radius of curvature of which is substantially the same as that of said screw, said screw and bottom lying in close juxtaposition and said passage is otherwise so disposed relative to the cutter and screw that a substantially uniform feed is obtained.

32. The combination with a flock cutter having a flock receptacle, of a feed screw adapted to discharge from opposite ends upon being rotated in opposite directions, and agitator mechanism cooperating with said screw to feed material and operable during either direction of rotation of said screw.

33. The combination with a flock cutter of the reversible rotary cutter type, of a feed screw therefor, means whereby said screw will feed flock automatically to either end of said cutter in accordance with the direction of rotation thereof, and an agitating mechanism associated with said screw.

34. The combination with a flock cutter, of a receptacle therefor having an opening, means forming a passage below said opening and in communication therewith, said means comprising an arcuate portion, a feed screw disposed within the passage adjacent said arcuate portion, and means forming a discharge at opposite ends of said passage.

35. The combination with a flock cutter of the reversible rotary cutter type, means forming a longitudinal passage having arcuate and upwardly extending portions, said passage terminating in flared openings communicating with opposite ends of said cutter, a feed screw disposed within said passage, a hopper carried on said passage forming means and having an opening communicating therewith, an agitating mechanism disposed within said hopper adapted to cooperate with said screw for effecting a uniform feed thereby, and means whereby flock will be discharged from one end or the other of said feed screw automatically in accordance with the direction of rotation of the cutters.

36. The combination with a flock cutter, of a feeding mechanism therefor including a screw adapted to discharge material from opposite ends thereof to opposite ends of said cutter, and means for variably driving said screw relative to said cutter.

37. The combination with a flock cutter, of a feeding mechanism therefor comprising means forming a passage having semi-circular and substantially straight portions, a discharge opening from said passage, and a rotatable feed screw disposed within said passage adjacent said curved portions.

38. The combination with a flock cutter, of a hopper having an elongated horizontal opening in the bottom thereof, a passage below said opening communicating therewith and with said cutter, a feed screw in said passage having a substantial area of its upper side exposed to said opening, and the remainder of said passage leading to said cutter being closed and so proportioned that flock may be fed from said screw to said cutter.

39. The combination with a flock cutter, of a flock receptacle having sides terminating in arcuate portions and an opening adjacent said portions, said opening communicating directly with the interior of said hopper, and rotary flock engaging means disposed adjacent said opening and adapted to sweep across said walls and in a radius substantially the same as the radii of said arcuate portions thereby preventing bridging of said opening by flock.

40. A flock cutter of the rotary type having a drive shaft, a feed screw therefor, and means for driving said screw at variable speeds by said drive shaft including another shaft and a member longitudinally movable thereon and adapted to be held in predetermined positions to effect varying drive speeds of said screw by driving torque applied thereto.

41. The combination with a flock cutter, of means for feeding flock thereto, including a receptacle and means for effecting substantially uniform conveyance of flock from the receptacle to said cutter, said latter means comprising a mechanical conveyor adapted to be continuously movable in one direction to produce movement of flock along a substantially linear path.

42. The combination with a flock cutter having a housing and a usual reversible rotary cutter therein and inlet openings at opposite ends thereof, a casting mounted upon said housing and having a longitudinal passage terminating at opposite ends in discharge passages communicating with said openings, and a hopper mounted on said casting and having an opening in communication with the longitudinal passage, a feed screw in said longitudinal passage mounted upon a shaft extending therethrough and adapted to discharge flock to said opposite ends, an agitator disposed within said hopper and including a rotary shaft having radially extending arms thereon, and a driving connection between the shafts of said agitator and screw.

43. The combination with a flock cutter, of a hopper having arcuate lower walls terminating adjacent an elongated longitudinal opening, means forming beneath said opening a longitudinal passage having an arcuate bottom, discharge passages inclining downwardly and outwardly from the ends of said longitudinal passage and allowing communication between said hopper and cutter, said discharge passages each flaring in the direction of flow of flock therethrough, a feed screw disposed in said longitudinal passage adjacent said arcuate bottom and having a substantial longitudinal portion of its upper area exposed to flock in said hopper through said opening, and a rotatable agitator disposed in said hopper adapted to sweep across said opening and the top of said screw.

In testimony whereof I affix my signature.

WILLIAM J. DECOTEAU.